April 10, 1956 W. M. CONWAY 2,741,066
TRAP
Filed April 6, 1953

William M. Conway
INVENTOR.

United States Patent Office 2,741,066
Patented Apr. 10, 1956

2,741,066
TRAP

William M. Conway, Bay Pines, Fla.

Application April 6, 1953, Serial No. 347,128

1 Claim. (Cl. 43—121)

This invention relates in general to improvements in traps, and more specifically to an improved insect trap.

It is therefore the primary object of this invention to provide a suitable trap for insects which is highly attractive to insects so that the same will enter the trap of their own volition so that they may be exterminated.

Another object of this invention is to provide an improved insect trap which is of an extremely simple construction and may be formed from containers having removable metal covers so as to be economically feasible.

Another object of this invention is to provide an improved cover for a container, said cover forming a major portion of an insect trap and having trap means in depending relation therewith in alignment with an insect entrance opening therethrough, the trap means being provided with an insect attracting material so as to encourage insects to pass through the entrance opening in the trap so that they may pass down through the trap means and be captured.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
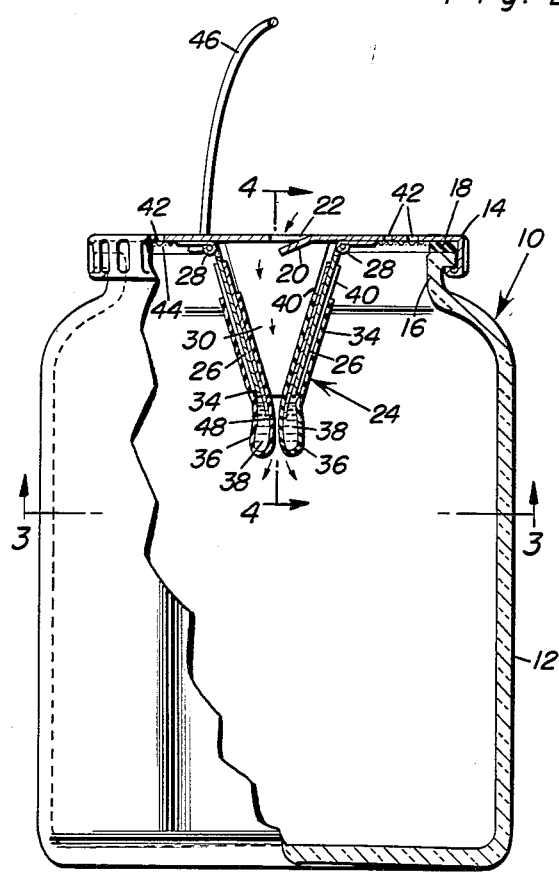
Figure 1 is an elevational view of the insect trap which is the subject of this invention and shows the general construction thereof, portions of the trap being broken away and shown in section in order to clearly illustrate arrangement of various elements thereof.

Referring now to the drawings in detail, it will be seen that the insect trap, which is the subject of this invention, is referred to in general by the reference numeral 10. The insect trap 10 includes a suitable container 12 having an upper opening 16 which is closed by a removable cover 14. It is preferred that the cover 14 be sealed with respect to the upper end of the container 12 by sealing means such as a resilient gasket 18.

Figure 2:
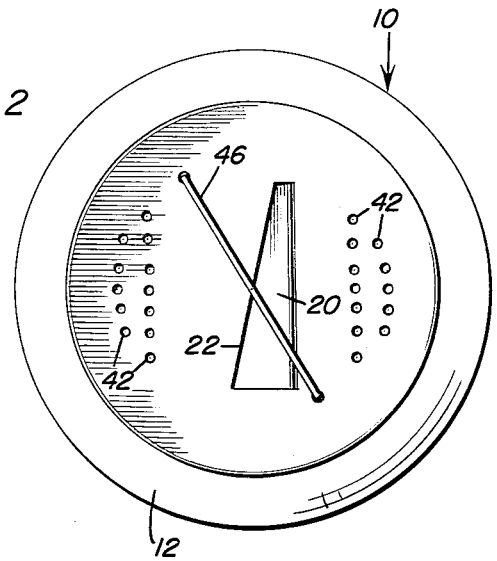
Figure 2 is a top plan view of the insect trap of Figure 1 and shows the arrangement of openings in the cover thereof.
Figure 3:
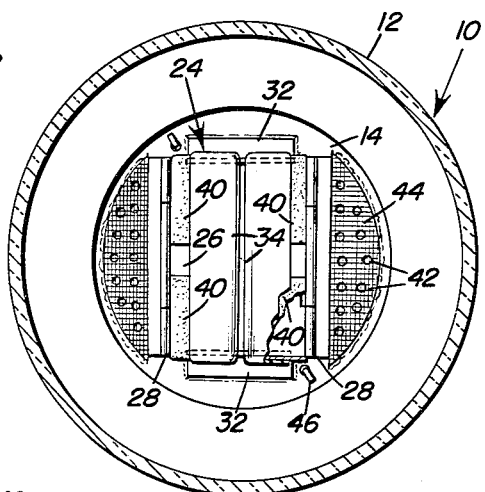
Figure 3 is a transverse vertical sectional view taken substantially on the plane indicated by the section line 3—3 of Figure 1 and shows a trap means as viewed from the bottom, portions of the trap means being broken away and shown in section.
Figure 4:
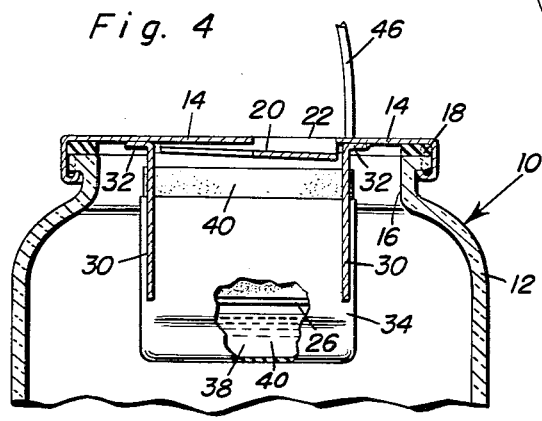
Figure 4 is a fragmentary vertical sectional view taken substantially upon the plane indicated by the section line 4—4 of Figure 1 and shows the general construction of the trap means and the manner in which the insect attracting material is stored and exposed to the elements.

As is best illustrated in Figures 1 and 2, portions of the cover 14 have been cut away to form an inwardly struck flange 20. The flange 20 forms a guideway into the container 12 and is disposed at one side of the entrance opening 22 formed in the cover. The entrance opening 22 is formed by the formation of the flange 20.

In order that insects entering through the opening 22 may be retained within the container 12, there is secured to the underside of the cover 14 in depending relation trap means which are referred to in general by the reference numeral 24. The trap means 24 includes a pair of opposed converging side members 26 which are hingedly connected to the underside of the cover 14 by hinges 28 to permit the entrance of an insect. The side members 26 are retained in the positions illustrated in Figure 1 by the friction of the hinges 28 or by equivalent means. The members 26 form sides of the trap means 24 and are retained in spaced relation by end members 30. It will be noted that the end members 30 are generally triangular in outline and also depend from the cover 14, the end members being provided with flanges 32 at their upper ends which are secured to the underside of the cover 14.

In order that insects may be attracted into the entrance opening 22, there is carried by each of the side members 26 a receptacle 34 which encloses a major portion thereof. The receptacle 34 is preferably in the form of a resilient sleeve which resiliently engages the associated side member 26. It will be noted that each receptacle 34 depends below its associated side member to form a pocket 36 in which is received a suitable insect attracting material 38.

In order that the scent of the insect attracting material 38 may be distributed to the exterior of the container 12 in order to attract the insects, there is disposed on opposite sides of each side member 26 strips of absorbent material 40. The strips of absorbent material 40 have lower ends thereof disposed adjacent the pockets and communicating with the interior thereof. The upper ends of the absorbent material 40 project above the upper confines of the receptacles 34. It is intended that the insect attracting material 38 be of a liquid form so that the same through capillary attraction is drawn up to the top of the absorbent material 40.

The scent of the insect attracting material 38 passes through the entrance opening 22 so as to lure insects therethrough. Insects are also lured to the trap 10 by scent of the insect attracting material 38 passing through a plurality of apertures 42 formed in the cover 14 on opposite sites of the entrance opening 22 as is best illustrated in Figure 2. In order to prevent escape of insects disposed within the container 12 through the apertures 42, there is secured to the underside of the cover 14 in surrounding relation to the upper portion of the trap means 24 grill means in the form of a fine mesh screen 44.

The trap 10 may be set in any convenient position either inside or outside of buildings or if desired may be suspended from trees or other suitable supports. In the event that the trap 10 is to be suspended from a suitable support, the cover 14 is provided with a bail 46 to facilitate the suspension of the same.

After insects attracted to the trap 10 pass through the entrance of the opening 22 they immediately fall down between the side members 26 and the end members 30 so as to pass through the space 48 between the lower ends of the receptacles 34. The insects then drop into the container 12 and their escape back through the space 48 is impossible due to the relatively small size of the space.

While the trap illustrated and described herein is primarily intended to catch flies, roaches, ants and gnats, it is to be understood that the invention is not so limited. If desired, the trap may also be utilized for collecting other types of insects by varying the insect attracting material carried in the pockets.

Since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

An insect trap comprising a cover for a container, said cover having an entrance opening, trap means carried by the underside of said cover in depending relation, said trap means preventing escape of insects through said entrance opening, said trap means including a pair of opposed swinging side members, rigid end members disposed inwardly of the ends of said side members, said end members retaining said side members in spaced relation, resilient receptacles removably telescoped over said side members, said receptacles having lower ends in the form of pockets adapted to carry an insect attracting material, and absorbent material carried by said receptacles in contact with said insect attracting material and extending out of said receptacles to continuously convey said insect attracting material out of said receptacles, said absorbent material overlying said side members.

References Cited in the file of this patent

UNITED STATES PATENTS

| | | |
|---|---|---|
| 731,398 | Watson | June 16, 1903 |
| 848,865 | Storer | Apr. 2, 1907 |
| 1,103,656 | Campbell | July 14, 1914 |
| 1,143,738 | Titus | June 22, 1915 |
| 1,176,610 | Sloan | Mar. 21, 1916 |
| 1,360,127 | McKay | Nov. 23, 1930 |
| 1,786,599 | Bullock | Dec. 30, 1930 |
| 2,100,909 | Mora | Nov. 30, 1937 |

FOREIGN PATENTS

| | | |
|---|---|---|
| 6,001 | Great Britain | 1897 |